United States Patent [19]

Niggemeyer

[11] 4,169,451

[45] Oct. 2, 1979

[54] ROTARY PISTON INTERNAL COMBUSTION ENGINE AND METHOD FOR INFLUENCING ITS OPERATION

[76] Inventor: Gerd G. Niggemeyer, Nibelungenstrasse 8, 6200 Wiesbaden, Fed. Rep. of Germany

[21] Appl. No.: 893,334

[22] Filed: Apr. 4, 1978

[30] Foreign Application Priority Data

Apr. 5, 1977 [DE] Fed. Rep. of Germany ....... 2715302

[51] Int. Cl.² .............................................. F02B 53/02
[52] U.S. Cl. .................................... 123/202; 123/216; 123/205; 123/242
[58] Field of Search ................ 123/205, 216, 218, 219, 123/242, 202

[56] References Cited

U.S. PATENT DOCUMENTS

3,487,815   1/1970   Marks .................................... 123/216

FOREIGN PATENT DOCUMENTS

2630805   1/1978   Fed. Rep. of Germany ........... 123/216

*Primary Examiner*—Michael Koczo
*Attorney, Agent, or Firm*—Blanchard, Flynn, Thiel, Boutell & Tanis

[57] ABSTRACT

A rotary piston internal combustion engine includes a two-curve housing, a triangular piston rotor in the housing and a pressure reservoir connected through a channel to the compression chamber, or volume, formed between the housing and rotary piston. Rotation of the piston rotor divides the compression volume into a main volume and an auxiliary volume of decreasing size, the channel being located to communicate with such auxiliary volume. A valve in the channel is opened and closed by a control system in variable synchronism with movement of the piston rotor. The control system includes a synchronous transmission adjustable in phase in response to temperature and/or pressure in the pressure reservoir, which in turn is influenced by throttling of inlet air to the engine, and such control system may include apparatus actuable to heat or cool the pressure reservoir, all to permit Diesel operation of the engine.

A method of operating such an engine including dividing the air being compressed into a main volume and an auxiliary volume during the latter part of a compression stroke with the auxiliary volume thereafter being eliminated by further movement of the piston rotor, temporarily storing a part of the compressed air in the pressure reservoir by entrapping same in the auxiliary volume, adding the temporarily stored part of the compressed air during the next following compression stroke to the air then to be compressed and to particularly enable reliable Diesel operation of the internal combustion engine, carrying out the adding of the temporarily stored air in the final phase of the next following compression stroke.

31 Claims, 11 Drawing Figures

ROTARY PISTON INTERNAL COMBUSTION ENGINE AND METHOD FOR INFLUENCING ITS OPERATION

FIELD OF THE INVENTION

This invention relates to a rotary piston internal combustion engine, and particularly to a method and apparatus for Diesel operation thereof.

BACKGROUND OF THE INVENTION

The subject matter of German OS No. 26 30 805 is a rotary piston internal combustion engine and a method for influencing the operation of such engine with a two-curve housing and triangular piston rotor, in which during the compression stroke a portion of the compressed medium is temporarily stored and is added during the then following compression stroke to the medium which must then be compressed. The portion of the medium temporarily stored is entrapped in the auxiliary volume, during the division of the compressed volume into a main volume and an auxiliary volume, at the end of the compression stroke, the auxiliary volume being eliminated thereafter by the advancing piston rotor.

As discussed in more detail in German OS No. 26 30 805, with such a method the compression of a rotary piston internal combustion engine can be increased in such a manner that it operates reliably and with good efficiency during all conceivable operating conditions also according to the Diesel principle. This is achieved substantially by temporarily storing a portion of the medium compressed during a first compression stroke and during the following second compression stroke adding the stored medium to the new medium which is then to be compressed. It was thereby already found that also the operating behavior of the internal combustion engine itself can be controlled by an influence of the temporarily stored medium, for example by removing a portion of this temporarily stored medium prior to adding it to the new medium to be compressed in such second compression stroke.

SUMMARY OF THE PRESENT INVENTION

The purpose of the present invention is to further develop the method and the rotary piston internal combustion engine of German OS No. 26 30 805 in such a manner that the operating behavior of the internal combustion engine can be controlled, or changed, with simple means in a manner to permit Diesel operation of the engine without breakdowns and reliably under all load conditions and during starting.

In a method of the above-mentioned type, this purpose is attained according to the present invention by adding the temporarily stored medium in the final phase of the next following compression stroke to the thereby comressed medium for Diesel operation of the internal combustion engine.

According to the present inventive method, thus the temporarily stored medium is added to the new medium which is to be compressed during a next following compression stroke only in the final phase of this next following compression stroke. The final phase of the compression stroke is to be understood as the part which starts at approximately 60° before top dead center. According to the principle disclosed in German OS No. 26 30 805. The rotary piston internal combustion engine may be considered to be of two parts: one part, associated with the first curve of the two-curve housing, operates as a compressor due to the separation of the compression volume into an auxiliary volume and a main volume, and a second part, associated with the second curve of the housing, operates as an actual combustion motor. In the method of the present invention, the medium removed from the auxiliary volume of the compression volume, in the compressor part of the engine, is temporarily stored in a pressure reservoir in a highly compressed state and is then added according to the principle of feedback with a time delay which is effected by a valve during the next following compression stroke to the thereby compressed new medium. This creates, according to the law of geometric series, a high effective pressure, which corresponds to a high compression. By changing the time delay, namely by changing the point of time at which the temporarily stored medium is added to the medium which must newly be compressed, the respective effective compression can be changed without thereby changing the expansion relationship resulting from the fixed geometric dimensions of the internal combustion engine. Furthermore, the effective compression can also be changed by heat supply to, or discharge from, the temporarily stored medium. Thus, a heat discharge reduces the effective compression, but the performance, i.e. power, of the internal combustion engine is increased, which effects, of course, also a small increase of the specific fuel consumption. On the other hand, by supplying heat to the medium temporarily stored in the pressure reservoir, the effective compression is increased, which leads to a reduction of the specific fuel comsumption and, particularly in throttled operation of the internal combustion engine, as during starting and idling and partial load operation, causes reaching of the automatic ignition temperature necessary for Diesel operation. If, however, the pressure reservoir is operated adiabatically, namely heat is neither fed to nor removed from the medium temporarily stored in it, then a desired intermediate compression is obtained at a performance which amounts to approximately 70% of the full load. The advancing of the point of time, at which the temporarily stored medium is fed to a medium which must be newly compressed during the next compression stroke, has thereby the same effect, as supplying heat to the medium temporarily stored in the pressure reservoir, namely in both cases the compression is increased, thus assuring during compression the achievement of a temperature sufficiently high for automatic ignition of the mixture. By thus advancing of the point of time, with a relatively small time delay during feedback, reliable Diesel operation can be initiated and maintained, even in starting and idling operation of the internal combustion engine.

Special embodiments of the new method and a new rotary piston internal combustion engine for carrying out the new method, respective developments and further embodiments of the invention are within the scope of the appended claims.

BRIEF DESCRIPTION OF THE DRAWINGS

The invention will be discussed more in detail in connection with the exemplary embodiments which are illustrated in the drawings.

DETAILED DESCRIPTION

Figure 1:
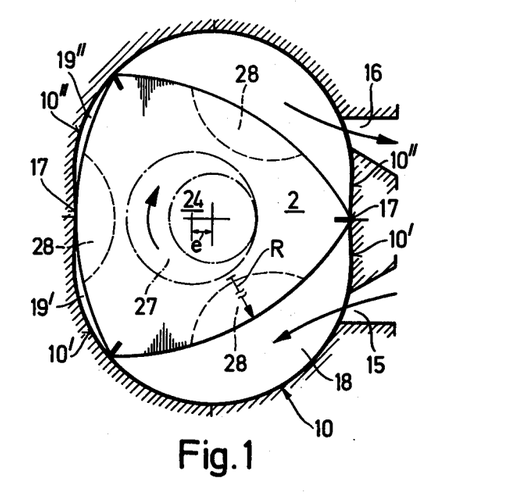
FIG. 1 is a schematic cross-sectional view of a rotary piston internal combustion engine with a two-curve, epitrochoid-shaped housing and a triangular piston rotor.

FIG. 1 illustrates the basic schematic structure of a rotary piston internal combustion engine with a two-curve, epitrochoid-shaped housing 10 and a triangular piston rotor 2, which is arranged in said housing and which is supported on an eccentric 27 which rotates around a shaft 24 in the center of the housing. The housing 10 has an inlet opening 15 in its first curve 10' and near the rightward one of the housing constructions 17 at the so-called small axis of the housing. Air or an air-fuel-mixture can be sucked through inlet opening 15 into a compression chamber 18. In the second curve 10" of the housing 10, before the same constriction 17 (behind which inlet opening 15 is provided), there is provided an outlet, or exhaust, opening 16, through which exhaust gases can be moved out from the internal combustion engine to the outside. Ignition and combustion usually takes place in such an internal combustion engine when the piston rotor 2 has just run through its position illustrated in FIG. 1, namely in the compression chambers 19' and 19". Compression chambers 19' and 19" are defined between the piston rotor and housing, on respective sides of the leftward constriction 17, and opposite the inlet opening 15 and outlet opening 16 respectively. In order for the medium to get from the compression chamber 19' into the compression chamber 19", an overflow trough 28 is provided in the piston rotor 2 of common rotary piston internal combustion engines, which overflow trough bridges the constriction 17. This overflow trough 28 in piston rotor 2 also serves as part of the combustion chamber so that during the initial stage of the combustion very high gas-transfer speeds occur here. The combustion chamber itself is very flat and elongated, which effects a poor utilization of the combustion energy.

Figure 2:
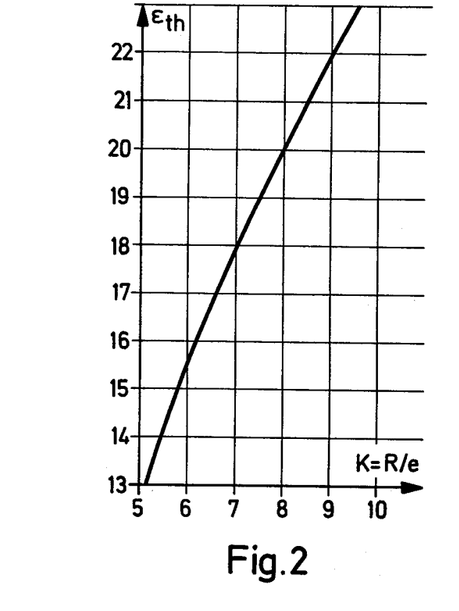
FIG. 2 graphically illustrates the relationship between the theoretical compression ratio and the geometric construction of the internal combustion engine according to FIG. 1.
Figure 3:
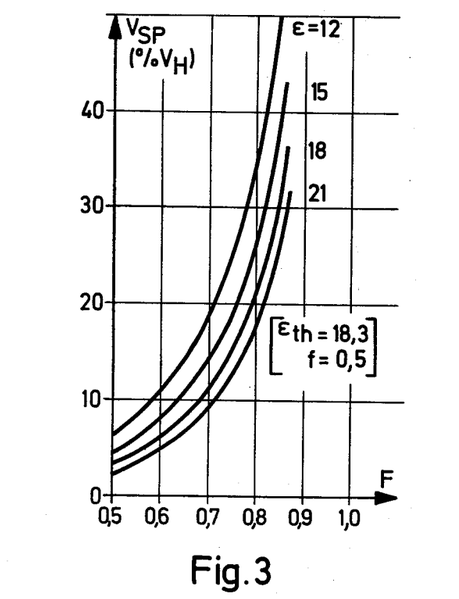
FIG. 3 graphically illustrates the dependency of the pressure reservoir volume from a desired compression and the geometric design of the internal combustion engine, which is given by the factor F.

The two-curve Wankel internal combustion engines which have been operated in prior years have in practice shown that the most favorable operating characteristics and structural design are achieved when the so-called K-factor lies in the range of 6.8 to 7.2. This K-factor is the relationship of the radius R of the piston rotor 2 to the eccentricity e of the eccentric 27. When the internal combustion engine is designed with the K-factor in the mentioned range, a theoretical compression ratio $\epsilon_{th}$ is obtained from the relationship of the volume of the compression chamber 18 at its maximum size to the combined volume of the two compression chambers 19' and 19" and overflow trough 28. If the volume of the overflow trough 28 is assumed theoretically as being zero, then a value of 17.5 to 18.5 is obtained for the compression ratio $\epsilon_{th}$ at the aforementioned K-factor. Even if the overflow trough is kept very small, the additional volume which is caused by it is substantially larger than zero, so that the compression ratio which is achieved in reality with such an internal combustion engine is not sufficient for automatic ignition, and thus for Diesel operation. FIG. 2 illustrates the achievable theoretical compression ratio $\epsilon_{th}$ in dependency from the geometric design of the rotor 2, namely from its K-value.

As a result of the above, in conventional rotary piston internal combustion engines with K-factors of between 6.8 and 7.2, which are favorable for operation, a compression ratio high enough for Diesel operation cannot be achieved without additional measures, as for example a compressor, or supercharger, connected in front of the inlet opening 15.

FIGS. 5 to 8 illustrate an exemplary embodiment of the type of rotary piston internal combustion engine disclosed in German OS No. 26 30 805, which exemplary embodiment is shown here improved in accord with the present invention. A pressure reservoir 6 is provided at the first curve 10' of the housing 10 before the upper constriction 17. Reservoir 6 connects to the inside of the housing 10 in the area of the first curve 10' through a connecting channel 3 containing a rotary spool valve 1. Channel 3 communicates with the inside of the housing through a port. The port of connecting channel 3 lies at a point on the inner wall of the first curve 10' within the range swept by the trailing edge 23 of the piston rotor surface facing such port, during rotation of eccentric shaft 24 over the angular range from 30° to past the top dead center up to 135° past top dead center, preferably between 45° to 90° past top dead center. The inlet opening 15 would normally thereby be arranged such that it is safely swept over by the trailing edge 23 of the piston rotor (which edge limits the respective compression volume) prior to the leading edge 21 (which limits the compression volume) releasing the connecting channel 3 to the pressure reservoir 6. However, this requirement for arrangement is not needed in the new internal combustion engine of the present invention, because of the valve 1 now arranged in the connecting channel.

The piston rotor 2 has one combustion chamber recess 26 in each of its three outer surfaces, in the portion thereof closer to the respective leading edge. In the here shown exemplary embodiment, recesses 26 are approximately dome-shaped.

For further details concerning the special construction of the rotary piston internal combustion engine according to German OS No. 26 30 805, reference is made to the latter.

As illustrated in FIGS. 5 to 8, the rotary spool valve 1 (provided in the new rotary piston internal combustion engine of the present invention, in the connection channel 3 to the pressure reservoir 6) is operated synchronously, in a certain phase relationship, to the rotation of the piston rotor 2, as discussed in more detail hereafter. For a rotary spool valve 1 having only one through-channel, as schematically illustrated in the drawings, the rotary slide valve completes one rotation while the eccentric 27 completes two rotations.

Figure 5:
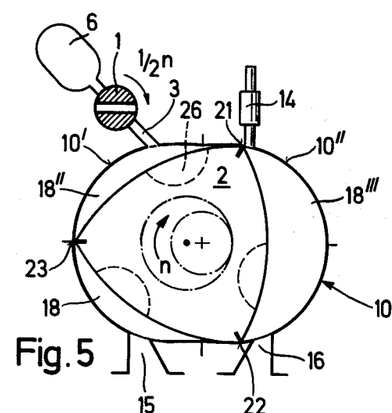
FIGS. 5 to 8 are schematic cross-sectional views of an embodiment of the inventive rotary piston internal combustion engine during four successive operating stages.

In the engine operating position of FIG. 5, piston rotor 2 is in a position 90° before top dead center, at which compression of the previously sucked-in air in the compression volume 18" takes place. The connecting channel 3 is closed at this point in time by the rotary spool valve 1.

Figure 6:
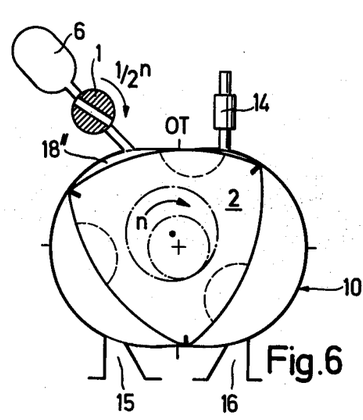

Upon a further rotation of the piston rotor 2, the air is further compressed in compression volume 18", as illustrated in FIG. 6 with piston rotor 2 at the 27° before top dead center position. The rotary spool valve 1 has in this position opened the connecting channel 3 to the pressure reservoir 6, so that air previously temporarily stored under high pressure in the pressure reservoir 6 is added to the air which is compressed in the compression volume 18", in order to further increase its compression.

Figure 7:
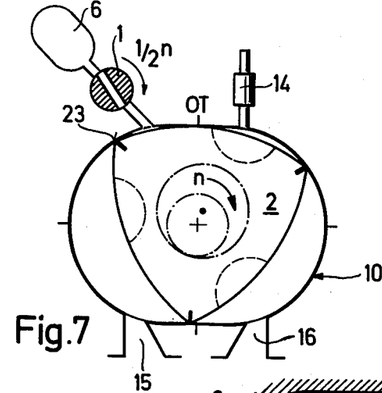

During further rotation of the piston rotor 2 to the 22° after top dead center position of FIG. 7, compression volume 18" splits into a main volume communicating with the fuel injection nozzle 14 and an auxiliary volume communicating with the connecting channel 3. The connecting channel 3 is still open through the rotary spool valve 1, so that now the rotating piston rotor 2 forces the air out of the auxiliary volume into the pressure reservoir 6 for temporary storage there.

Figure 8:
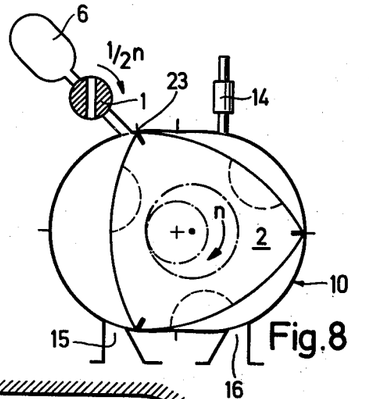

As seen from comparison of FIGS. 7 and 8, the rotary spool valve 1 closes prior to passing of the port of connecting channel 3 by the trailing edge 23 of the piston rotor 2, so that the air stored earlier in the pressure reservoir 6 is locked therein.

In the 90° after top dead center position of FIG. 8, combustion has already taken place and the induction stroke for the quantity of air next to be compressed is nearly completed. Thus the engine operating step shown in FIG. 8 is followed by repetition of the operating steps of FIGS. 5 to 7.

As will be recognized from FIGS. 5 to 8 as above discussed, that part of the engine, connected to pressure reservoir 6 in the area of the first curve 10' of the housing 10, operates as a compressor, which compressor supplies air under high pressure to the pressure reservoir 6, while that part of the engine, connected to the injection nozzle 14 in the area of the second curve 10", operates as an actual internal combustion engine, in which the combustion takes place.

By determining, in relation to the respective position of the piston rotor 2, the overflow point of time at which the medium temporarily stored in pressure reservoir 6 enters the compression volume 18" of the new quantity of medium to be compressed, the operating behavior of the inventive internal combustion engine can be controlled. This is done substantially by the compression ratio being changed by changing the overflow point of time within certain limits, without however changing the expansion ratio determined by the geometric dimensions of the internal combustion engine.

This can also be proven theoretically, as follows:

In the internal combustion engine according to FIGS. 5 to 8, the filling ratio for the pressure reservoir, or geometric ratio of division, F is defined as $$F = \frac{Q_{SP}}{Q_{SP} + Q_K} = \frac{Q_{SP}}{Q_{SP} + Q_H + Q_{BR} + Q_{\epsilon th}}$$
$$= \frac{V_{SP} + V_{SiK}}{V_{SP} + V_{SiK} + V_{BR} + V_{SIB}}$$

$$\boxed{F = \frac{V_{SP} + V_{SiK}}{V_{SP} + V_{BR} + V_{\epsilon th}}},$$

wherein:

$Q_{SP}$ is the filling capacity extending into the pressure reservoir 6 after completing the compression step, which equals the filling capacity in the pressure reservoir 6 and in the sickle-shaped compression chamber 19' to the left of constriction 17, at the point of time (as between FIGS. 6 and 7) when the connection is cut between the combustion chamber recess 26 and the sickle-shaped compression chamber 19' in the first curve 10';

$Q_K$ is the amount of air contained in the compression chamber 18' after closing of the inlet opening 15 and prior to the opening of the rotary spool valve 1 (as between FIGS. 8 and 5);

$Q_H$ is the filling capacity of the entire stroke volume $V_H$;

$Q_{BR}$ is the filling capacity of the combustion chamber recess 26;

the magnitudes identified with V are the volumes of individual chambers in the internal combustion engine at the point of time when the trailing end of combustion chamber recess 26 in piston rotor 2 passes the upper constriction 17, namely a point of time between the phases illustrated in FIGS. 6 and 7, at which all considered chambers are connected and have substantially the same pressure, whereby individually $V_H$ is the entire stroke volume, $V_{SP}$ is the volume of the pressure reservoir 6, $V_{SiK}$ is the volume of the sickle-shaped compression chamber under the first curve 10', $V_{SIB}$ is the volume of the sickle-shaped storage reservoir under the second curve 10", and $V_{BR}$ is the volume of the combustion chamber recess 26 in the piston rotor 2.

The compression ratio $\epsilon_{,u}$ in %, which can be reached after a number u of eccentric shaft rotations after starting the rotary piston engine, can be calculated from the formula $$\epsilon_{,u} = 100 (1 - F^u) (\%),$$

whereby the magnitude F is determined from the aforelisted geometric relationships.

The method for the compression increase, which method is achieved in the new method and is applied in the rotary piston motor according to FIGS. 5 to 8, follows the law of a geometric series, the terminal members of which are after u rotations.

$$\epsilon_{,u} = (\epsilon_g - 1)(1 + \frac{V_{BR}}{V_H} + \frac{1}{\epsilon_{th} - 1}) \frac{1 - F^u}{1 - F} + F^u;$$

whereby of course $F < 1$, and $V_H = 1$ $\epsilon_g$ means in this the geometric compression which is given from the structural magnitudes, whereby $$\epsilon_{th} = 1 + \frac{V_H}{V_{\epsilon th}}, \text{ so that}$$

$$\epsilon_g = 1 + \frac{V_H}{V_{SP} + V_{BR} + \frac{V_H}{\epsilon_{th} - 1}} \text{ is valid.}$$

The desired necessary compression $\epsilon$ is determined by the volumetric dimensions $V_{BR}$ of the combustion chamber recess 26 and the partial compression chamber $V_{SiB}$. This necessary compression follows the relation:

$$\epsilon = \frac{(\epsilon_g - 1)(1 + \frac{V_{BR}}{V_H} + \frac{1}{\epsilon_{th} - 1})}{1 - F} =$$

$$\frac{V_H + V_{BR} + \frac{V_H}{\epsilon_{th} - 1}}{(1 - F)(V_{BR} + V_{SP} + \frac{V_H}{\epsilon_{th} - 1})}$$

$$\boxed{\epsilon = \frac{V_H + V_{BR} \frac{V_H}{\epsilon_{th} - 1}}{V_{BR} + \frac{f \cdot V_H}{\epsilon_{th} - 1}}}, \text{whereby}$$

$$f = \frac{V_{SiB}}{V_{SiB} + V_{SiK}} = \frac{V_{SiB}}{V_{\epsilon th}}.$$

From the above relation for $\epsilon$ it can easily be read, that the volume $V_{BR}$ of the combustion chamber recess 26 is determining for the compression in the internal combustion engine. Since during each eccentric shaft rotation a fill is received in the internal combustion engine, it is necessary also that during each eccentric shaft rotation a fill for combustion is transported on. We deal here with a self-regulating system. If the pressure during the compression stage is too low in the compression chamber, then the pressure drops in the combustion chamber and little air is transported on.

·If the pressure is too high, then the pressure in the combustion chamber rises and more than one fill is moved on. The geometric ratio of division "F" represents the amount of air which is fed to the pressure reservoir 6 upon reaching top dead center in order to again add this portion during the next compression stroke. The internal combustion recess 26 which is arranged in the front part of each outer surface of the piston rotor 2 determines decisively the level of the compression. The trailing end edge (e.g. 23) of the rotor 2 determines the point of time of the gas division in the relation F, as has already been discussed above. The upper constriction 17 along the minor axis of the housing 10 holds back the part F of the air in cooperation with the sealing surface following combustion chamber recess 26 in the outer surface of the piston rotor 2.

In order to determine the upper limit of the factor F, one can for example start out from the requirement that the internal combustion engine is supposed to be started at an inlet air temperature of $t_1 = -30°$ C. without applied ignition with as few as possible starting rotations. If for the number of starting rotations $u = 25$ is considered as the maximum value, corresponding with 7.5 sec. at a starting eccentric shaft rotation 200/min. there results $$u = \frac{\log(1 - \frac{\epsilon, u, \%}{100})}{\log F}$$

or $$F = (1 - \frac{\epsilon, u, \%}{100})^{\frac{1}{u}}.$$

Figure 4:
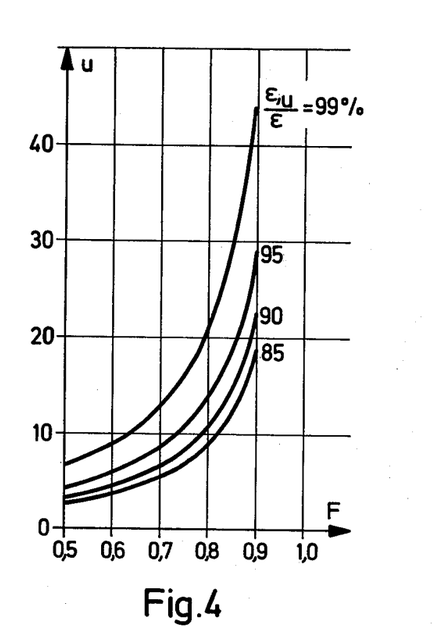
FIG. 4 graphically illustrates the relationship, during engine starting, between the number of rotations necessary to reach the needed compression, and the geometric design of the internal combustion engine, which is given by the factor F.

From this one can see that a value of $F = 0.92$ should not be exceeded. The abovelisted special relationships are illustrated in the diagram of FIG. 4.

In practice, a geometric design of the rotary piston motor, such that the factor F lies in the range of between 0.75 to 0.85, corresponding with a storage volume of approximately 25% $V_H$, should achieve the most balanced results.

Figure 9:
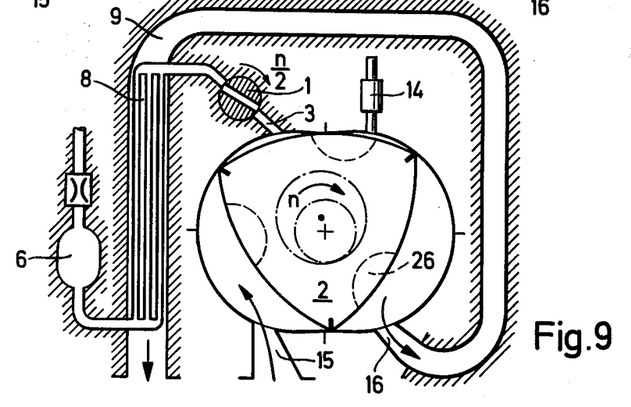
FIG. 9 is a further schematic cross-sectional view of the internal combustion engine shown in FIGS. 5 to 8, along with a heat supply through the exhaust gases to the temporarily stored medium.

The compression $\epsilon$ can also be effected during running of the internal combustion engine by influencing the air which is temporarily stored in the pressure reservoir 6. If for example heat is discharged from the temporarily stored air, then also the effective compression is lowered, the expansion ratio of the internal combustion engine being otherwise unchanged. However, if heat is fed to the temporarily stored air, for example as in FIG. 9, from the exhaust gas of the internal combustion engine with the help of an exhaust tail pipe 9 and a heat exchanger 8, then the effective compression $\epsilon$ rises, the expansion ratio of the internal combustion engine being otherwise unchanged. An equal increase of the effective compression is, however, also achieved advancing the overflow point of time, at which the rotary spool valve 1 is opened, in order to add the air which is temporarily stored in the pressure reservoir 6 to the air which much newly be compressed. This is discussed below in connection with FIGS. 10 and 11.

Figure 10:
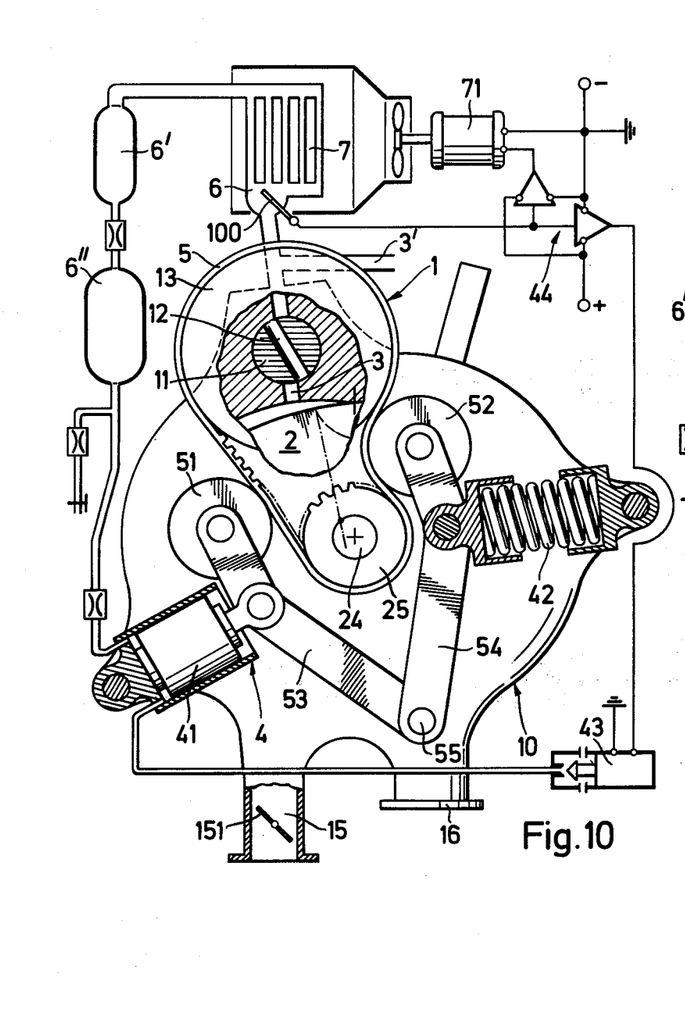
FIGS. 10 and 11 schematically illustrate a practical exemplary embodiment of the new internal combustion engine at two overflow points of time, which are adjusted variably by a control mechanism, from the pressure reservoir into the compression volume.
Figure 11:
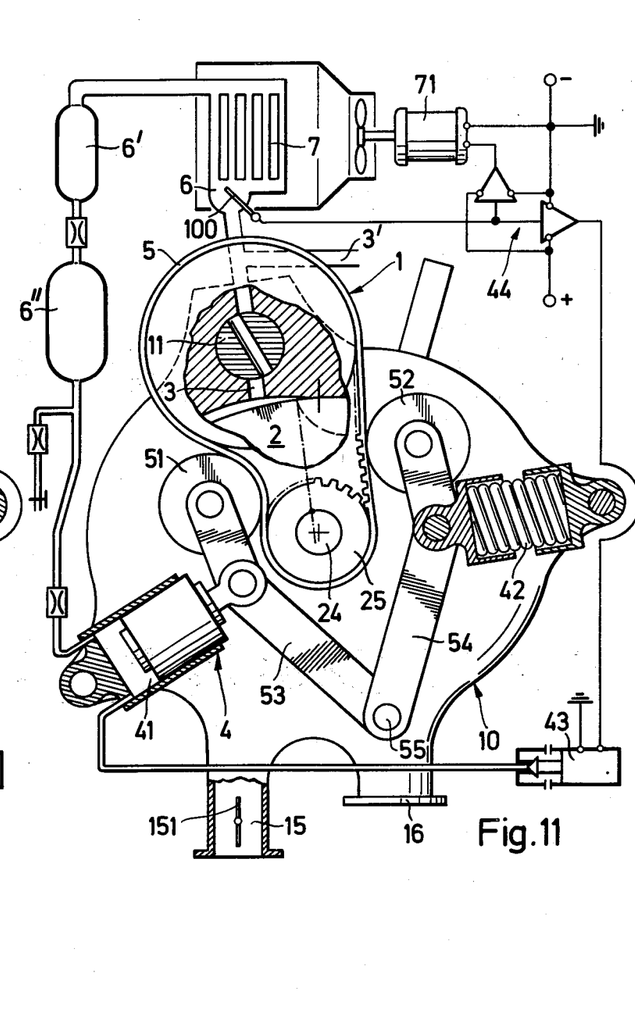

FIGS. 10 and 11 schematically illustrate a practical exemplary embodiment of the inventive rotary piston internal combustion engine with a control mechanism 4 for influencing its operating behavior.

More particularly, partly sectioned and partly broken away FIGS. 10 and 11 show that rotary spool valve 1 has a rotary slide valve member 11, which is fixed on a rotary slide valve shaft indicated by its axis at 12, but not here illustrated in detail. Slide valve member 11 has only one single through bore, which after each half rotation of rotary slide valve member 11 is in alignment with the connecting channel 3. A control gear 13 is fixed against rotation on the rotary slide valve shaft 12. A control gear 25 is also fixed against rotation on the eccentric shaft 24. The two control gears 13 and 25 are connected through a toothed belt 5, so that the rotary slide valve shaft 12 rotates synchronously with the eccentric shaft 24. More particularly, the rotary slide valve member 11 rotates synchronously with the piston rotor 2. The speed ratio between the control gear 25 and the control gear 13 is thereby 2:1, so that for every complete rotation of the rotary slide valve member 11, the eccentric 27 completes two rotations. Tensioning disks, or idlers, 51 and 52 are each rotatable on the free ends of levers 53 and 54, and act on the toothed belt 5 at its reaches between the two control gears. Levers 53 and 54 are pivoted at their other ends on a common stationary bearing point 55 and are constructed equally symmetrically with respect to one another. The first lever 53 is swung about the common bearing point 55 by an operating mechanism 41 which is here constructed as a pneumatic servomotor. However, a return spring 42 acts on the second lever 54, which return spring presses the lever 54 toward the toothed belt 5.

As above discussed with respect to FIGS. 5 to 9, the internal combustion engine has an inlet opening 15, in which a throttle flap 151 is arranged in the usual manner. The outlet opening 16 can also be recognized in FIGS. 10 and 11.

The connecting channel 3 ends in a first pressure reservoir 6, which is connected to the pneumatic servomotor 41 through further pressure reservoirs 6' and 6" which are connected in series. Restrictors can thereby be provided between the individual pressure reservoirs and also the servomotor 41, in order to effect a substantially static drive of the servomotor 41. Through a further restrictor it is also possible to discharge the air temporarily stored in the pressure reservoirs 6, 6' and 6" to further, not here illustrated, devices, as for example a compressed-air brake of a vehicle. The first pressure reservoir 6 is provided with a heat exchanger 7, to which an electric fan 71 supplies a stream of air, in order to cool the heat exchanger 7 and thus withdraw heat from the air temporarily stored in pressure reservoir 6. In place of the electric fan 71, the heat exchanger 7 can of course also be cooled by the air flow past a vehicle driven by the engine, whereby for controlling the size of the air stream, throttle flaps can be provided.

A temperature sensor 100 in the pressure reservoir 6 measures the temperature of the air temporarily stored in the pressure reservoir 6 and emits a corresponding electrical signal to an electric circuit 44, which controls for example the electric fan 71 or the above-mentioned air stream throttle flap arrangement not here shown. An output signal, produced by circuit 44 in accord with the sensor's temperature signal, is transferred to an electromagnetic valve 43, which closes or opens a discharge line connected to the pneumatic servomotor 51.

The operation of the control mechanism 4 for influencing the operation of the new rotary piston internal combustion engine is discussed below.

As can be recognized from FIG. 10, the throttle flap 151 is almost closed in the inlet opening 15, resulting in partially throttled operation, for example idling operation, of the interal combustion engine. In such operation of a common rotary piston internal combustion engine exists the danger that the automatic ignition temperature is not achieved in Diesel operation, because the compression $\epsilon$ is not sufficient. In the new internal combustion engine of the present invention, this specific behavior of a rotary piston internal combustion engine is automatically balanced with the help of the control mechanism 4. In part throttle or idling operation, as for example directly after starting the internal combustion engine, the pressure of the air which is stored in the pressure reservoir 6 is relatively low so that only a small air pressure acts on the piston of the pneumatic servomotor 41. Furthermore, the temperature of the air temporarily stored in the pressure reservoir 6 is then also relatively low, as is sensed by the temperature feeler 10. A suitable signal from the circuit 44 therefore turns off the fan 71, so that no further cooling of the temporarily stored air takes place. Also it is contemplated that this output signal of the circuit 44 could also cause the feeding of heat to the temporarily stored air, for example with the help of an electric heating system, or through reversal of throttle flaps for a heat exchanger 8 (illustrated in FIG. 9) in the engine exhaust tail pipe 9. At any rate, the output signal of circuit 44 causes opening of the electromagnetic valve 43, so that the pressure transmitted from the pressure reservoir 6 to the pneumatic servomotor 51 can escape through the discharge pipe of the latter. Therefore, the servomotor 41 does not apply, in this stage of operation of the engine, a controlling force on the first lever 53. The tensioning disk 51 supported rotatably on lever 53 therefore also does not apply any force worth mentioning onto the toothed belt 5. On the other hand, however, the return spring 42 applies through its lever 54 and associated tensioning disk 52 a considerable force onto the toothed belt 5, so that same is bent into its position shown in FIG. 10.

As can easily be understood, the straightening of the toothed belt 5 on its side adjacent to the tensioning disk 51, and the simultaneous bending inward of the toothed belt 5 on its side adjacent to the tensioning disk 52 to their FIG. 10 positions, causes a relative rotational adjustment between the two control gears 13 and 25, causing a phase shifting in the synchronization between the two control gears and thus also between the rotary slide valve member 11 and piston rotor 2. As can be recognized from the broken-away portion of engine housing 10, the rotary spool valve 1 opens up at a relatively early point of time prior to reaching the top dead center position, at which time the combustion chamber recess 26 has not travelled much beyond the port of the connecting channel 3. Thus in this operation condition of the inventive internal combustion engine, work is done with a very early overflow point of time for the air temporarily stored in the pressure reservoir 6. Such an early overflow point of time increases the effective compression $\epsilon$ and at the same time lowers the specific fuel consumption and furthermore contributes to an increase of the automatic ignition temperature and thus also to a corresponding increase in temperature of the air temporarily stored in the pressure reservoir 6. This shift forward of the overflow point of time acts therefore in exactly the same manner as a heat supply to the air stored in the pressure reservoir 6. FIGS. 10 and 11 illustrate different positional relations of the controlled valve 11 and piston rotor 2.

FIG. 11 illustrates the same internal combustion engine as FIG. 10, but during full-load operation, in which the throttle flap 151 is completely open. Such operation of the engine occurs for example during strong acceleration of a vehicle equipped with this engine. During such operation, high torque is desired, and the effective compression can be lowered. Since here for the purpose of increasing performance, the energy absorption of the compressor part is to be reduced and thus heat must be discharged. However, only so much heat is discharged at all times that a safe automatic ignition temperature is still maintained. The heat discharge leads to a small increase in specific fuel consumption. During such full load engine operation, the pressure and temperature of the air temporarily stored in the pressure reservoir 6 also increase accordingly. Therefore, a considerable pressure acts onto the pneumatic servomotor 41, which pressure adjusts the servomotor, if at the same time its discharge pipe is closed by the electromagnetic valve 43. Such closure of valve 43 is caused by the circuit 44, if same receives at its input from the temperature sensor 100 an electrical signal which indicates a relatively high temperature for the air temporarily stored in the pressure reservoir 6. At the same time, the fan 71 is turned on by an electrical signal received from the circuit 44, so that the air temporarily stored in the pressure reservoir 6 is cooled by the heat exchanger 7. A heat discharge from the air stored in the storage reservoir 6 leads to a reduction of the effective compression and a slight increase of the specific fuel consumption, and also to an increase in torque and thus in engine performance.

The increased pressure load on the servomotor 41 causes it to move the first lever 53 toward the toothed belt 5, so that same now becomes completely straightened on its side facing the tightening disk 52 and completely bent in on its side facing the tightening disk 51. From this results an opposite phase shift in synchronization, so that now the rotary spool valve 1 opens at a relatively late overflow point of time, such that the piston rotor 2 is much closer to the top dead center position at the overflow point of time, than in the operating position shown in FIG. 10.

Even though FIGS. 10 and 11 illustrate the two extreme positions, of course any desired inbetween positions are possible between these two extreme positions, so that the internal combustion engine operates in each case with the correct compression to achieve either an optimum low fuel consumption with a sufficient engine performance, or instead a greater engine performance at a slightly increased fuel consumption.

Of course, the tightening disks 51 and 52 can have a smaller diameter, which causes the control range between the two extreme positions to become even greater and the overflow point of time can be changed in for example a 45° range of eccentric shaft rotation angles.

The toothed belt 5 shown in this exemplary embodiment can of course be replaced with a common roller chain, whereby then the control gears and possibly also the tightening disks 51 and 52 are constructed as suitable sprocket wheels.

The output signal emitted by the electrical circuit 44 can also be given to an indicating mechanism, not here shown, to indicate to an operator the instantaneous operating of the internal combustion engine state, so that the operator can operarte the internal combustion engine at an optimum.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a method for controlling the operation of a rotary piston internal combustion engine of the type having a two-curve housing and triangular piston rotor, in which such method includes dividing the compressed medium into a main volume and an auxiliary volume during a compression stroke, the auxiliary volume thereafter being dissipated by the piston rotor, and temporarily storing a part of the compressed medium during said compression stroke, by entrapping such part with said auxiliary volume during said division, and thereafter during the next following compression stroke adding the said temporarily stored part of said compressed medium to the medium then to be compressed, wherein the improvement comprises, for Diesel operation of the internal combustion engine, carrying out said adding of the temporarily stored medium in the final phase of said next following compression stroke to the thereby compressed medium.

2. Method according to claim 1, in which said final phase starts approximately 60° before top dead center.

3. Method according to claim 2, including withdrawing heat from said temporarily stored medium prior to said adding of it to the compressed medium and therewith increasing the specific power output of the internal combustion engine.

4. Method according to claim 2, including supplying heat to said temporarily stored medium prior to adding it to the compressed medium and therewith lowering the specific fuel consumption and/or maintaining the necessary automatic ignition temperature in the throttled operation.

5. Method according to claim 2, including shifting forward the point of time of adding the temporarily stored medium and thereby producing heat required for throttled operation of the engine, lowering the specific fuel consumption and/or for maintaining the necessary automatic ignition temperature.

6. Method according to claim 4, including taking the supplied heat from exhaust gases produced by the engine.

7. Method according to claim 3, including withdrawing said heat in a heat exchanger cooled by a stream of air.

8. Method according to claim 1, including effecting one of a heat supply to and a heat discharge from said temporarily stored medium and holding in a narrow range the optimum ignition temperature of the medium which reaches combustion by controlling the heat supply or discharge depending on the type of engine operation.

9. Method according to claim 8, including measuring the temperature of the temporarily stored medium and effecting said controlling of the heat supply or discharge in accordance with the measured temperature.

10. Method according to claim 5, including controlling the point of time of adding the temporarily stored medium in accordance with its pressure.

11. Method according to claim 5, including controlling the point of time of adding the temporarily stored medium in accordance with its temperature.

12. Method according to claim 5, including controlling said point of time by phase shifting a synchronous transmission between the movement of the piston rotor and the operation of a valve mechanism which effects said adding of said temporarily stored medium.

13. In a rotary piston internal combustion engine having at least one two-curve housing, at least one triangular piston rotor and at least one pressure reservoir connected to a compression volume of the housing through at least one connecting channel, the piston rotor having a position where it effects a separation of the compression volume of the housing into a main volume and an auxiliary volume, said connecting channel opening through the portion of the housing wall which bounds the auxiliary volume when the latter is shrunk by advancing of the piston rotor, the improvement comprised by an actively controlled valve arranged in said connecting channel, and a control means controlling said valve for closing said valve prior to the sliding by of an edge of the piston rotor, which edge runs ahead of the next compression volume, and for opening said valve to said next compression volume in the final phase of the compression thereof.

14. Internal combustion engine according to claim 13, in which said valve is a rotary spool valve, having a rotary slide valve member driven through a synchronous transmission from the piston rotor.

15. Internal combustion engine according to claim 14, including a shaft and an eccentric supporting said piston rotor on said shaft and in which said synchronous transmission includes an endless toothed belt between a first control gear connected to said rotor shaft or eccentric, and a second control gear connected to a shaft of said slide valve member.

16. Internal combustion engine according to claim 15, including tensioning elements engaging said toothed belt and operated by said control means for changing the length of said toothed belt between the adjacent contact points of said toothed belt on said first control gear and on said second control gear and therewith for phase shifting said synchronous transmission.

17. Internal combustion engine according to claim 16, in which said tensioning elements each comprise a tensioning disk arranged rotatably on one end of a lever, said levers being symmetrical to one another and supported each with their free end on a common stationary swivel point, said control means including an operating mechanism, one of said levers being pivotable about said swivel point by said operating mechanism of said control means, the other of the levers being pivotable about said swivel point against the toothed belt under the action of a return spring, tensioning of the toothed belt by the operating mechanism acting against the action of the return spring.

18. Internal combustion engine according to claim 17, in which said operating mechanism comprises a servomotor connected to said one lever.

19. Internal combustion engine according to claim 18, including means for feeding said servomotor pneumatically directly from the medium temporarily stored in said pressure reservoir.

20. Internal combustion engine according to claim 18, including an electrically controlled valve, in which said servomotor is controlled pneumatically through said electrically controlled valve, and means controlling the latter by an electrical signal that indicates at least one of the temperature and pressure of said temporarily stored medium.

21. Internal combustion engine according to claim 14, in which the transmission ratio of the synchronous transmission is such that the shaft of said rotary slide valve member carries out a complete rotation for each two complete rotations of the shaft of said piston rotor.

22. Internal combustion engine according to claim 13, including a heat exchanger connected to said pressure reservoir for withdrawing heat from the medium temporarily stored in said pressure reservoir.

23. Internal combustion engine according to claim 22, in which the heat exchanger is arranged in a stream of air.

24. Internal combustion engine according to claim 23, including a fan for controlling said stream of air and in turn controlled in accordance with an electrical signal variable with the temperature of the temporarily stored medium.

25. Internal combustion engine according to claim 23, including a throttle mechanism for controlling said stream of air and which is controlled in accordance with an electrical signal variable with the temperature of the temporarily stored medium.

26. Internal combustion engine according to claim 13, including a heat exchanger connected to said pressure reservoir, which heat exchanger feeds heat to the medium temporarily stored in said pressure reservoir.

27. Internal combustion engine according to claim 26, in which said heat exchanger lies in the exhaust gas stream of the internal combustion engine.

28. Internal combustion engine according to claim 13, including a temperature sensor associated with the pressure reservoir to measure the temperature of the temporarily stored medium, and an electrical circuit connecting said sensor to the control means.

29. Internal combustion engine according to claim 28, including an indicating mechanism, which indicates to the operator of the internal combustion engine its respective operating behavior and to which said electrical circuit is connected.

30. Internal combustion engine according to claim 13, including several pressure reservoirs connected in series.

31. Internal combustion engine according to claim 13, including several said connecting channels each associated with a respective housing and a respective piston rotor and connected to one common said pressure reservoir.

* * * * *